United States Patent Office 3,519,434
Patented July 7, 1970

3,519,434
HOMOGENEOUS GELLED MEAT PRODUCT AND
METHOD OF MAKING SAME
Harry R. Schuppner, Jr., El Cajon, Calif., assignor to
Kelco Company, San Diego, Calif., a corporation of
Delaware
No Drawing. Continuation-in-part of application Ser. No.
502,446, Oct. 22, 1965. This application June 22, 1966,
Ser. No. 559,418
Int. Cl. A22c 21/00, 25/00
U.S. Cl. 99—107                                    14 Claims

ABSTRACT OF THE DISCLOSURE

A substantially homogeneous, gelled meat product, said product comprising meat, water, a Xanthomonas hydrophilic colloid and locust bean gum at a total concentration ranging from about 0.02 to about 4% by weight of said water, with the weight ratio of said Xanthomonas hydrophilic colloid to said locust bean gum being such as to form a firm, cohesive, aqueous gel.

A method for preparing a substantially homogeneous gelled meat product, said method comprising forming a hot aqueous mixture containing meat, locust bean gum, and a Xanthomonas hydrophilic colloid, the total concentration of said Xanthomonas hydrophilic colloid and said locust bean gum ranging from about 0.02% to about 4% by weight of said water, and the weight ratio of said Xanthomonas hydrophilic colloid to said locust bean gum being sufficient to form a firm cohesive gel, maintaining said hot aqueous mixture for a time period adequate to permit a sufficient quantity of locust bean gum to go into solution to form a gel through interaction with the Xanthomonas colloid on cooling, and cooling said hot aqueous mixture to form a firm, cohesive gelled meat product.

---

This application is a continuation-in-part of my earlier filed copending United States patent application Ser. No. 502,446, filed Oct. 22, 1965 and entitled "Heat Reversible Gel and Method."

This invention relates to the preparation of a gelled meat-containing product. More particularly, this invention relates to a gelled meat-containing product containing locust bean gum in admixture with a Xanthomonas hydrophilic colloid.

Various food products are known in which meat, animal tissue, or pieces of fat are formed into a monolithic structure. Such products include, for example, various luncheon meats, dog food, and the like.

Various methods are known for forming such products. One method which is commonly used involves pressing meat products in comminuted form into a mold to form it into a semi-solid state where it will hold its shape. Another method which has been used previously involves encasing the meat products in a rigid gel network. Among the various gel formers which have been employed for such purposes are gelatin, agar, carrageenin, pectins, alginates, Danish Agar, and starches.

The methods employed by the prior art have not been entirely satisfactory in forming a monolithic meat-containing product. The pressing of meat products to form a molded product in a semi-solid state generally requires that the meat be comminuted prior to being pressed. If it is desired to use chunks of meat in the final product, rather than meat in a finely comminuted form, the desired product cannot generally be made in this manner.

The various gels which have been employed previously in forming a gelled meat-containing product have likewise not been entirely satisfactory. The various prior art gel-forming ingredients are capable of producing only a slight increase in viscosity of a hot aqueous medium. This makes their use difficult in producing a gelled meat-containing product. To illustrate, when the gel-forming ingredients and the meat are added to hot water, the heavier meat particles will have a natural tendency to settle out and give a non-homogeneous mixture. The low viscosity imparted to the hot aqueous medium does not aid to any appreciable extent in keeping the meat particles in suspension. This is particularly true if, for example, the meat employed is present in the form of large chunks.

To offset the natural tendency of the meat particles to settle, it is generally necessary to agitate the hot meat-containing aqueous medium. During the cooling of the aqueous medium to form the desired gel structure, continuation of agitation, of course, tends to hinder the formation of the gel. At the same time, if the agitation is stopped during cooling, the meat particles will tend to settle so as to form a non-homogeneous gel structure. This can prove especially undesirable if, for example, cooling is conducted after the hot aqueous meat-containing medium has been added to the final container. In this instance, the resultant product will have the meat concentrated at the bottom of the container while the aqueous gel is at the top of the container. This presents an unappetizing appearance to the consumer when the can is opened and gives a non-homogeneous product. It calls the consumer's attention to the lack of meat in the product rather than its presence by first exposing to view the aqueous gel which conceals the meat at the bottom of the container.

A further disadvantage of gelled meat products of the prior art concerns the nature of the gelled meat product itself. In a gelled meat product, it is generally desirable that the gel be fairly firm and cohesive so as to adequately support the meat contained therein. To illustrate, if the product contains chunks of meat, it is desirable that the gel have sufficient strength to hold the meat chunks firmly when the product is cut. Otherwise, the pressure applied in cutting through the meat chunks will dislodge the chunks from the gel.

In obtaining the desired firmness in a prior art meat gel, the gel was generally increased in brittleness. This made cutting difficult, even though the meat particles were firmly held by the gel.

An object of the invention is to proivde a novel gelled meat product have a generally homogeneous consistency and a firm, cohesive gel structure.

A further object is to provide a gelled meat-containing product containing locust bean gum in admixture with a Xanthomonas hydrophilic colloid.

A still further object is to provide a method for forming a gelled meat-containing product.

Additional objects will become apparant from a reading of the specification and claims which follow.

Gelled meat-containing products prepared according to my invention are formed by cooling a hot aqueous mixture containing meat, locust bean gum, and a Xanthomonas hydrophilic colloid. Preferably, the temperature of the hot mixture ranges from about 150 to about 180° F. More preferably, the temperature of the hot mixture is approximately 180° F.

Locust bean gum is sparingly soluble in water at 70° F. and its solubility increases gradually above this point with increasing temperature. In order to form a gelled meat-containing product according to my invention, it is desirable that a sufficient quantity of locust bean gum go into solution in the hot water to form a firm gel through interaction with the Xanthomonas hydrophilic colloid on cooling. In forming meat-containing gels according to my invention, the hot aqueous mixture is generally held at a temperature within the range of 150 to 180° F. for a sufficient period of time to allow the locust bean gum to go into solution. A suitable period of time is, for example, about 15 minutes. When employing higher temperatures, the time may be reduced to a lesser time such as about 5 minutes. The time, temperature, degree of agitation, and the degree of fineness of the locust bean gum and Xanthomonas hydrophilic colloid can all be varied in practicing the present invention so long as a sufficient quantity of locust bean gum goes into solution in the hot water.

The total quantity of the Xanthomonas hydrophilic colloid and locust bean gum which I employ ranges from about 0.02% to about 4% by weight of the water, Since meat itself contains a substantial quantity of water, it will be understood that the quantity of water present in the meat which is added will, of course, affect the quantity of the Xanthomonas hydrophilic colloid and locust bean gum which are employed. Preferably I employ a total quantity of Xanthomonas hydrophilic colloid and locust bean gum within the range from about 0.25 to about 2.5% by weight of the water since I have found that very satisfactory gels are formed within this concentration range.

As stated previously, the copresence of a Xanthomonas hydrophilic colloid with locust bean gum has the considerable advantage of providing a relatively high viscosity in the hot aqueous meat-containing mixture which is subsequently cooled to form the gelled meat product. To illustrate, an aqueous medium containing 1% by weight of a mixture comprising 60 parts of a *Xanthomonas campestris* hydrophilic colloid with 40 parts of locust bean gum has a viscosity of 630 centipoises at a temperature of 176° F. At higher temperatures, the viscosity is slightly lowered and as the temperature is lowered the viscosity increases uniformly until the point of gelation where there is a rapid increase in the viscosity of the system. The degree of subdivision of the meat particles employed will, of course, be a factor in determining the required viscosity for the hot aqueous meat-containing gel-forming system. When a meat gel is prepared which contains large chunks of meat having a tendency to settle out, the viscosity of the hot meat-containing aqueous system will be increased to reduce settling.

The weight ratio of locust bean gum to Xanthomonas hydrophilic colloid which I employ can be varied over a relatively wide range. Preferred weight ratios of a Xanthomonas hydrophilic colloid to locust bean gum for use in forming a gelled meat product according to my invention generally range from about 75:25 to about 40:60.

Preferably, the particle size of the finely divided locust bean gum and Xanthomonas hydrophilic colloid which I employ is such that 100% of the ingredients will pass through a 100-mesh screen. Such a state of fine subdivision assists in the solubility of the ingredients in water.

On cooling of the hot aqueous meat-containing medium, a gel is formed at temperatures ranging from about 118 to about 130° F. The gel which is formed is heat reversible such that on reheating of the gel to a temperature within this range it is found that the system becomes liquid at approximately the same temperature as that at which the gel was originally formed. I have found that the heat reversible characteristics of the gel enhances the eating properties of the gelled meat product. The temperature encountered in the mouth when the product is consumed is sufficiently high to soften the gel structure and liquefy it to a minor degree. This creates a pleasant eating sensation and improves the mouth feel of the product.

The Xanthomonas hydrophilic colloids employed in my invention are colloidal materials which are produced by bacteria of the genus Xanthomonas. Illustrative of such colloidal materials is the hydrophilic colloid produced by the bacterium *Xanthomonas campestris*. This colloidal material is a polymer containing mannose, glucose, potassium glucuronate and acetyl radicals. In such a colloid, the potassium portion can be replaced by several other cations without substantial change in the property of the said material for my purpose. The said colloid, which is a high molecular weight, exocellular material, may be prepared by the bacterium *Xanthomonas campestris*, by whole culture fermentation of a medium containing 2–5% commercial glucose, organic nitrogen source, dipotassium hydrogen phosphate and appropriate trace elements. The incubation time is approximately 96 hours at 28° C., aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparation of *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting *Xanthomonas campestris* colloidal material which I have found to be particularly suitable for my purpose can be recovered by precipitation in methanol of the clarified mixture from the fermentation. This resulting material may also be designated as a pseudoplastic, heteropolysaccharide hydrophilic colloid or gum produced by the bacterium species *Xanthomonas campestris*.

Other Xanthomonas colloidal materials may be prepared by repeating the procedure used for producing the *Xanthomonas campestris* colloidal material described above by substituting known Xanthomonas bacterium or organisms, i.e., *Xanthomonas corotae, Xanthomonas incanae, Xanthomonas begoniae*, and *Xanthomonas malvacearum*, for the bacterium *Xanthimonas campestris*.

All of the various Xanthomonas hydrophilic colloids are suitable in practicing the present invention. To illustrate, a variety of temperature reversible gels were formed using various Xanthomonas hydrophilic colloids in admixture with locust bean gum. The procedure generally employed was to dry blend the particular Xanthomonas colloid with locust bean gum with each being in finely divided form. The dry blended mixture was then added to hot water at a temperature of 180° F. to form a mixture which was stirred for 15 minutes while maintaining the temperature at 180° F. The hot solution was then poured into a Bloom Gelometer bottle and allowed to stand for 17 hours at room temperature. Following this, gelometer readings were taken for each of the various gels by employing a 1-inch diameter Lucite plunger. The gelometer was adjusted for a 4 mm. depression and to deliver 200±5 gms. of shot in 5 seconds. The results are set forth in the following table in which column one discloses the percent concentration of both the Xanthomonas hydrophilic colloid and the locust bean gum in terms of the weight of the aqueous medium and column two shows the Bloom gelometer reading obtained for each of the gels. The Bloom gelometer readings shown in column two are average figures based on three separate Bloom gelometer readings for each of the gels.

TABLE I

| Percent of Xanthomonas hydrophilic colloid and percent of locust bean gum: | Bloom gelometer readings (gms.) |
|---|---|
| 0.50% *Xanthomonas campestris*, 0.50% locust bean gum | 40.3 |
| 0.625% *Xanthomonas malvaceaum*, 0.50% locust bean gum | 77.9 |
| 0.875% *Xanthomonas carotae*, 0.50% locust bean gum | 52.6 |
| 0.825% *Xanthomonas begoniae* (St. 3) 0.50% locust bean gum | 56.6 |
| 0.55 *Xanthomonas begoniae* (St. 9) 0.50% locust bean gum | 47.4 |
| 0.75% *Xanthomonas incanae* 0.50% locust bean gum | 37.0 |
| 1.875% *Xanthomonas phaseoli* 0.50% locust bean gum | 44.5 |
| 1.00% *Xanthomonas campestris* 0.00% locust bean gum | 12.7 |
| 1.00% locust bean gum 0.00% *Xanthomonas campestris* | 10.0 |

As shown in the above table, all of the various Xanthomonas hydrophilic colloids produced firm, cohesive and thermally reversible gels. Moreover, the gel formed from a 50:50 mixture of *Xanthomonas campestris* hydrophilic colloid with locust bean gum had a gel strength which was synergistically increased over the gel strengths produced by employing either *Xanthomonas campestris* hydrophilic colloid or locust bean gum alone. Specifically, 1% by weight of *Xanthomonas campestris* hydrophilic colloid produced a Bloom Gelometer reading of only 12.7 gms. and 1% by weight of locust bean gum produced a Bloom Gelometer reading of only 10.0 gms. Yet, unexpectedly, 0.50% of *Xanthomonas campestris* hydrophilic colloid in admixture with 0.5% of locust bean gum produced a firm, cohesive gel having a Bloom Gelometer reading of 40.3 gms. Similarly, it has been found that Xanthomonas hydrophilic colloids other than that produced by the bacterium *Xanthomonas campestris* react synergistically with locust bean gum to produce firm, cohesive gels whose gel strengths are far in excess of that predicted from the individual actions of a Xanthomonas hydrophilic colloid and locust bean gum.

To further illustrate my invention there are presented the following examples in which all parts and percentages are by weight unless otherwise indicated.

EXAMPLE I

| | Weight percent |
|---|---|
| Meat (chunks) | 50.00 |
| Water | 48.75 |
| Sodium metabisulfite | 0.15 |
| Benzoic acid | 0.10 |
| *Xanthomonas campestris* hydrophilic colloid | 0.50 |
| Locust bean gum | 0.50 |
| Flavor, color, as desired. | |

The meat and water were combined and cooked for 20–30 minutes. The *Xanthomonas campestris* hydrophilic colloid, locust bean gum, benzoic acid, sodium metabisulfite, flavors, and coloring were dry blended and added to the cooked meat with good agitation. After stirring for about 10 minutes the blend was packaged and allowed to cool to form a gelled dog food.

EXAMPLE II

| | Grams |
|---|---|
| *Xanthomonas campestris* hydrophilic colloid | 1.00 |
| Locust bean gum | 1.00 |
| Canned salmon (drained) | 454.00 |
| Salt | 6.00 |
| Egg yolks | 40.00 |
| Butter | 20.00 |
| Milk | 200.00 |
| Vinegar (50 gr.) | 30.00 |
| Sugar | 20.00 |

The salmon was washed in hot water and separated into flakes. The salt, egg yolks, butter, milk and vinegar were then blended thoroughly to form a liquid mixture. The sugar, *Xanthomonas campestris* hydrophilic colloid and locust bean gum were dry blended and added slowly to the liquid mixture with good agitation. The mixture was cooked over boiling water with constant stirring until thickened. At this point the salmon was added and blended in well after which the mixture was added to molds and chilled to form a molded salmon salad.

EXAMPLE III

| (I) | Grams |
|---|---|
| *Xanthomonas campestris* hydrophilic colloid | 1.50 |
| Locust bean gum | 1.50 |
| Sugar | 20.00 |
| Butter | 20.00 |
| Milk | 180.00 |
| Egg yolks | 40.00 |
| (II) | |
| Canned tuna (flakes) | 150.00 |
| Prepared mustard | 5.00 |
| Prepared horseradish | 3.00 |
| Chopped sweet pickles | 30.00 |
| Celery seed | 1.00 |
| Tomato paste | 30.00 |

The *Xanthomonas campestris* hydrophilic colloid and locust bean gum were dry blended with the sugar and added to the milk, butter and egg yolks. The mixture (I) was cooked over boiling water, stirring constantly until it thickened. The ingredients of Part II were then added and blended in well. Following this, the mixture was added to molds and chilled to form a molded tuna salad.

EXAMPLE IV

| (I) | Grams |
|---|---|
| Water | 120.00 |
| *Xanthomonas campestris* hydrophilic colloid | 0.75 |
| Locust bean gum | 0.75 |
| Sugar | 15.00 |
| (II) | |
| Chopped cooked ham | 340.00 |
| Prepared mustard | 5.00 |
| Chopped olives | 50.00 |
| Prepared horseradish | 5.00 |
| Mayonnaise | 45.00 |

The *Xanthomonas campestris* hydrophilic colloid, locust bean gum and sugar were dry blended and added to the water with good agitation. The mixture was then heated to a boil. The ingredients of Part II were then combined and added to the mixture (I), mixing in well. The mixed material was then filled into molds and chilled to form a cold ham mousse.

As shown by the foregoing examples and specification, my invention provides a wide variety of gelled meat products. These products are readily cuttable and have a firm, cohesive texture. Due to their method of preparation, in which the gel structure is formed by cooling a fairly viscous meat-containing aqueous mixture, the products are characterized by their substantial homogeneity as compared with products of the prior art.

My products may be formed by either adding a cooked meat to hot water together with a Xanthomonas hydrophilic colloid and locust bean gum or, conversely, may be formed by adding an uncooked meat to water along with gel-forming ingredients. With the addition of an uncooked meat to water with the gel-forming ingredients, the meat can then be cooked, without having any adverse affect upon the Xanthomonas hydrophilic colloid and locust bean gum, prior to cooling to form a gelled meat-containing product.

The term "meat" as used herein includes poultry, fish, beef, lamb, pork, and the like. As stated previously, any of the various Xanthomonas hydrophilic colloids may be employed in the practice of my invention. The colloid produced by the bacterium *Xanthomonas campestris* is, however, preferred in forming the gelled meat products of my invention.

The term "water" as used herein includes water contained in food products, such as the water in milk, in a meat broth, etc.

Having fully defined my invention in the foregoing specification and examples, I desire to be limited only by the lawful scope of the appended claims.

I claim:

1. A substantially homogeneous, gelled meat product, said product comprising subdivided meat particles, water, a Xanthomonas hydrophilic colloid and locust bean gum at a total concentration ranging from about 0.02 to about 4% by weight of said water, with the weight ratio of said Xanthomonas hydrophilic colloid to said locust bean gum being such as to form a firm, cohesive, aqueous gel.

2. The product of claim 1 wherein said Xanthomonas hydrophilic colloid is produced by the bacterium *Xanthomonas campestris.*

3. The product of claim 1 wherein the weight ratio of said Xanthomonas hydrophilic colloid to said locust bean gum ranges from about 75:25 to about 40:60.

4. The product of claim 1 wherein said Xanthomonas hydrophilic colloid is produced by the bacterium *Xanthomonas malvacearum.*

5. The product of claim 1 wherein said meat is present in the form of chunks.

6. The product of claim 1 wherein said Xanthomonas hydrophilic colloid and said locust bean gum are present at a total concentration ranging from about 0.25 to about 2.5% by weight of said water and the weight ratio of said Xanthomonas hydrophilic colloid to said locust bean gum ranges from about 75:25 to about 40:60.

7. A substantially homogeneous gelled meat product, said product comprising subdivided meat particles, water, a *Xanthomonas campestris* hydrophilic colloid and locust bean gum, the total concentration of said *Xanthomonas campestris* hydrophilic colloid and said locust bean gum ranging from about 0.25 to about 2.5% by weight of said water, and the weight ratio of said *Xanthomonas campestris* hydrophilic colloid to said locust bean gum ranging from about 75:25 to about 40:60.

8. A method for preparing a substantially homogeneous gelled meat product, said method comprising forming a hot aqueous mixture containing subdivided meat particles, locust bean gum, and a Xanthomonas hydrophilic colloid, the total concentration of said Xanthomonas hydrophilic colloid and said locust bean gum ranging from about 0.02% to about 4% by weight of the water in said mixture, and the weight ratio of said Xanthomonas hydrophilic colloid to said locust bean gum being sufficient to form a firm cohesive gel, maintaining said hot aqueous mixture for a time period adequate to permit a sufficient quantity of locust bean gum to go into solution to form a gel through interaction with a Xanthomonas colloid on cooling, and cooling said hot aqueous mixture to form a firm, cohesive gelled meat product.

9. A process of claim 8 wherein said hot aqueous mixture has a temperature ranging from about 150° to about 180° F.

10. The process of claim 8 wherein said Xanthomonas hydrophilic colloid is produced by the bacterium *Xanthomonas campestris.*

11. The process of claim 8 wherein the weight ratio of said Xanthomonas hydrophilic colloid to said locust bean gum ranges from about 75:25 to about 40:60.

12. The process of claim 8 wherein said Xanthomonas hydrophilic colloid is produced by the bacterium *Xanthomonas malvacearum.*

13. The process of claim 8 wherein said Xanthomonas hydrophilic colloid and said locust bean gum are present at a total concentration ranging from about 0.25 to about 2.5% by weight of said water and the weight ratio of said Xanthomonas hydrophilic colloid to said locust bean gum ranges from about 75:25 to about 40:60.

14. A method for forming a substantially homogeneous gelled meat product, said method comprising forming a hot aqueous mixture having a temperature ranging from about 150 to about 180° F., said mixture containing subdivided meat particles, locust bean gum, and a *Xanthomonas campestris* hydrophilic colloid, the total quantity of said *Xanthomonas campestris* hydrophilic colloid and said locust bean gum ranging from about 0.25 to about 2.5% by weight of the water in said mixture, and the weight ratio of said *Xanthomonas campestris* hydrophilic colloid to said locust bean gum ranging from about 75:25 to about 40:60, maintaining said hot aqueous mixture for a time period adequate to permit a sufficient quantity of locust bean gum to go into solution to form a gel through interaction with the *Xanthomonas campestris* colloid on cooling, and cooling said hot aqueous mixture to form a firm, cohesive, temperature reversible gelled product.

References Cited

UNITED STATES PATENTS

| | | | |
|---|---|---|---|
| 3,067,038 | 12/1962 | O'Connell ___________ | 99—144 |
| 3,232,929 | 2/1966 | McNeely et al. | |
| 3,248,232 | 4/1966 | Krajewski ___________ | 99—194 |

HYMAN LORD, Primary Examiner

U.S. Cl. X.R.

99—108, 111